US012699243B2

(12) United States Patent　　　　(10) Patent No.: US 12,699,243 B2

Assale et al.　　　　　　　　　　　　(45) Date of Patent:　Aug. 4, 2026

(54) OPTICAL DEVICE MOUNTING ASSEMBLIES

(71) Applicant: Telefonaktiebolaget LM Ericsson (publ), Stockholm (SE)

(72) Inventors: Marco Assale, Genoa (IT); Claudio D'Incà, Genoa (IT); Sergio Mosti, Genoa (IT); Sergio Lanzone, Genoa (IT); Gianni Paparella, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 329 days.

(21) Appl. No.: 18/263,004

(22) PCT Filed: Jan. 29, 2021

(86) PCT No.: PCT/EP2021/052174
§ 371 (c)(1),
(2) Date: Jul. 26, 2023

(87) PCT Pub. No.: WO2022/161622

PCT Pub. Date: Aug. 4, 2022

(65) Prior Publication Data

US 2024/0103241 A1　　Mar. 28, 2024

(51) Int. Cl.
G02B 6/44　　　　(2006.01)

(52) U.S. Cl.
CPC ......... G02B 6/4441 (2013.01); G02B 6/4457 (2013.01)

(58) Field of Classification Search
CPC ............................ G02B 6/4441; G02B 6/4457
See application file for complete search history.

(56) References Cited

U.S. PATENT DOCUMENTS

| | | | | |
|---|---|---|---|---|
| 6,788,871 | B2 * | 9/2004 | Taylor .................. | G02B 6/4454 |
| | | | | 385/136 |
| 7,220,144 | B1 * | 5/2007 | Elliot ................... | G02B 6/4441 |
| | | | | 439/535 |
| 10,359,590 | B2 * | 7/2019 | Haile-Mariam ....... | G02B 6/444 |
| 10,527,805 | B2 * | 1/2020 | Mizuno ............... | G02B 6/4246 |
| 2004/0047581 | A1 * | 3/2004 | Tomino ............... | G02B 6/4284 |
| | | | | 385/135 |
| 2007/0173111 | A1 | 7/2007 | Elliot et al. | |
| 2008/0131132 | A1 * | 6/2008 | Solheid .............. | G02B 6/44528 |
| | | | | 398/117 |
| 2011/0026893 | A1 * | 2/2011 | Omori .................. | G02B 6/4453 |
| | | | | 385/135 |
| 2019/0317291 | A1 | 10/2019 | Cams et al. | |
| 2020/0192042 | A1 | 6/2020 | Coan et al. | |

OTHER PUBLICATIONS

International Search Report and Written Opinion of the International Searching Authority, PCT/EP2021/052174, mailed Sep. 28, 2021, 13 pages.

* cited by examiner

*Primary Examiner* — Ryan A Lepisto
(74) *Attorney, Agent, or Firm* — Sage Patent Group

(57)　　　　ABSTRACT

An optical device mounting assembly is provided. The mounting assembly comprises: a base member for an optical device to be mounted on, wherein the base member comprises an opening formed in the base member such that the optical device at least partially overlaps the opening when mounted on the base member; and an optical fibre guide for an optical fibre extending from the optical device to be disposed about in order to support a length of the optical fibre on the mounting assembly, wherein the optical fibre guide is located at least partially within the opening in the base member.

17 Claims, 6 Drawing Sheets

OPTICAL DEVICE MOUNTING ASSEMBLIES

CROSS REFERENCE TO RELATED APPLICATIONS

This application is a 35 U.S.C. § 371 national stage application of PCT International Application No. PCT/EP2021/052174 filed on Jan. 29, 2021, the disclosure and content of which is incorporated by reference herein in its entirety.

TECHNICAL FIELD

The present disclosure relates to optical device mounting assemblies, optical device systems comprising optical device mounting assemblies and telecommunications network equipment comprising optical device mounting assemblies.

BACKGROUND

With reference to FIG. 1, during production and/or installation of optical devices 2, such as optical amplifiers, optical connectors 4 are connected to one or more lengths of optical fibre 6 extending from the optical device 2.

If one of the optical connectors 4 becomes damaged during manufacture or during the service life of the optical device 2, it may be desirable to replace the damaged optical connector. To replace the damaged optical connector, a cut may be made in the optical fibre 6 to remove the damaged optical connector and enable a replacement connector be connected to the optical fibre 6.

Whether performed in a factory environment or in the field, connecting optical connectors to optical fibres is a difficult operation and risks damaging the optical fibre, thereby compromising the performance of the optical path. If the optical path is compromised, it may be desirable to repeat the operation of connecting the optical connector, by cutting the optical fibre and connecting a replacement connector. If an insufficient length of optical fibre 6 remains extending from the optical device 2 for connecting a replacement optical connector, the replacement optical connector cannot be connected and the optical device is scrapped.

To account for the fact that it may be necessary to replace one or more of the optical connectors 4, and to reduce the number of optical devices 2 that are scrapped, optical devices 2 are typically produced with each of the optical fibres 6 having an additional length to allow for one, two or more replacements of the optical connector 4 to be performed, even when post-production replacement of the optical connector 4 is not envisaged.

SUMMARY OF INVENTION

According to an aspect of the present disclosure, there is provided an optical device mounting assembly. The mounting assembly comprises: a base member for an optical device to be mounted on, wherein the base member comprises an opening formed in the base member such that the optical device at least partially overlaps the opening when mounted on the base member; and an optical fibre guide for an optical fibre extending from the optical device to be disposed about in order to support a length of the optical fibre on the mounting assembly, wherein the optical fibre guide is located at least partially within the opening in the base member. In this way at least part of the optical fibre supported by the optical fibre guide is disposed within the opening.

By providing the optical fibre guide on the optical device mounting assembly, an additional length of optical fibre extending from the optical device can be supported by the optical device mounting assembly. This allows the optical device to be installed with the additional length without risking damage to the optical fibre in use of the optical device. This in turn allows for the possibility of replacing the optical connector connected to the optical fibre, rather than scrapping the optical device, if the optical connector becomes damaged.

Additionally, by locating the optical fibre guide at least partially within the opening in the base member, a dimension of the optical device mounting assembly can be reduced. This can enable a greater number of optical device mounting assemblies to be coupled to rack mountable devices, such as telecommunications network devices, within an available space, which can enable the data transport capacity of the telecommunications network devices to be increased.

The optical fibre guide may at least partially define one or more cylindrical surfaces about which the optical fibres can be wound. For example, the optical fibre guide may comprise one or more spools about which the optical fibres can be wound.

A radius of the one or more cylindrical surfaces defined by the optical fibre guide may be equal to or greater than a minimum bending radius of the optical fibre. In this way the risk of damage to the optical fibres when supported by the optical fibre guide may be reduced.

The optical fibre guide may comprise one or more protrusions. The protrusions may protrude outwardly relative to the cylindrical surfaces for retaining the optical fibres about the optical fibre guides.

The optical fibre guide may at least partially defines two cylindrical surfaces about and/or between both of which the optical fibres can be wound. The two cylindrical surfaces may be spaced apart from one another in a direction perpendicular to central axes of the cylindrical surfaces.

A thickness of the optical fibre guide may be less than or equal to a thickness of the base member at the opening, e.g. a thickness of the base member through which the opening is formed. The opening may be formed in a plate shaped body of the base member. The thickness of the optical fibre guide may be less than or equal to a thickness of the plate shaped body of the base member. The optical fibre guide may be completely received, e.g. recessed, within the opening in the base member.

The mounting assembly may comprise an optical connector attachment point for an optical connector to be mounted on. The optical fibre guide may be arranged to support the optical fibre between the optical device and the optical connector attachment point.

The mounting assembly may further comprise a cover at least partially overlapping the opening. The cover may be provided on an opposite side of the optical fibre guide from the optical device when the device is mounted on the base member.

The assembly may further comprise a plate coupled to the base member and at least partially overlapping the opening. The optical fibre guide may be coupled to the plate. A portion of the opening not overlapped by the plate and/or the optical device may define a space for the optical fibres to be routed from the optical device to and/or from the optical fibre guide through the opening.

The base member may comprise one or more fixings for the optical device to be coupled to the base member. The one or more fixings may be arranged to mount the optical device on an opposite side of the plate from the optical fibre guide. In other arrangements, the optical device may be coupled to the plate, e.g. on an opposite side of the plate from the optical fibre guide. For example, the one or more fixings may be coupled to the plate and the optical device may be coupled to the plate by the one or more fixings.

The base member may comprise a printed circuit board, e.g. for one or more electronic components to be mounted on and/or electrically connected to.

An optical device system may comprise an optical device, the optical device comprising a device body, one or more optical fibres extending from the device body; and one or more connectors coupled to distal ends of the optical fibres respectively; and the above-mentioned optical device mounting assembly. The device body may be mounted on the base member. Portions of the optical fibres extending between the optical device and the connectors may be disposed about the optical fibre guide.

According to another aspect of the present disclosure, there is provided telecommunications network equipment comprising the above-mentioned optical device mounting assembly or the above mentioned optical device system.

According to another aspect of the present disclosure, there is provided telecommunications network equipment. The telecommunications network equipment comprising: a rack defining a plurality of spaces, e.g. for receiving rack mountable equipment, such as a rack mountable telecommunications network devices. The telecommunications network equipment may further comprise one or more of the above-mentioned optical device mounting assemblies and/or one or more of the above-mentioned optical device systems. The one or more optical device mounting assemblies and/or one or more optical device systems may be arranged in respective spaces defined by the rack, e.g. coupled to rack mountable equipment mounted in the spaces.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

For a better understanding of the present invention, and to show more clearly how it may be carried into effect, reference will now be made, by way of example, to the accompanying drawings, in which:

FIG. 3b is a perspective top view of the mounting assembly shown in FIG. 3a;

DETAILED DESCRIPTION

Figure 2:
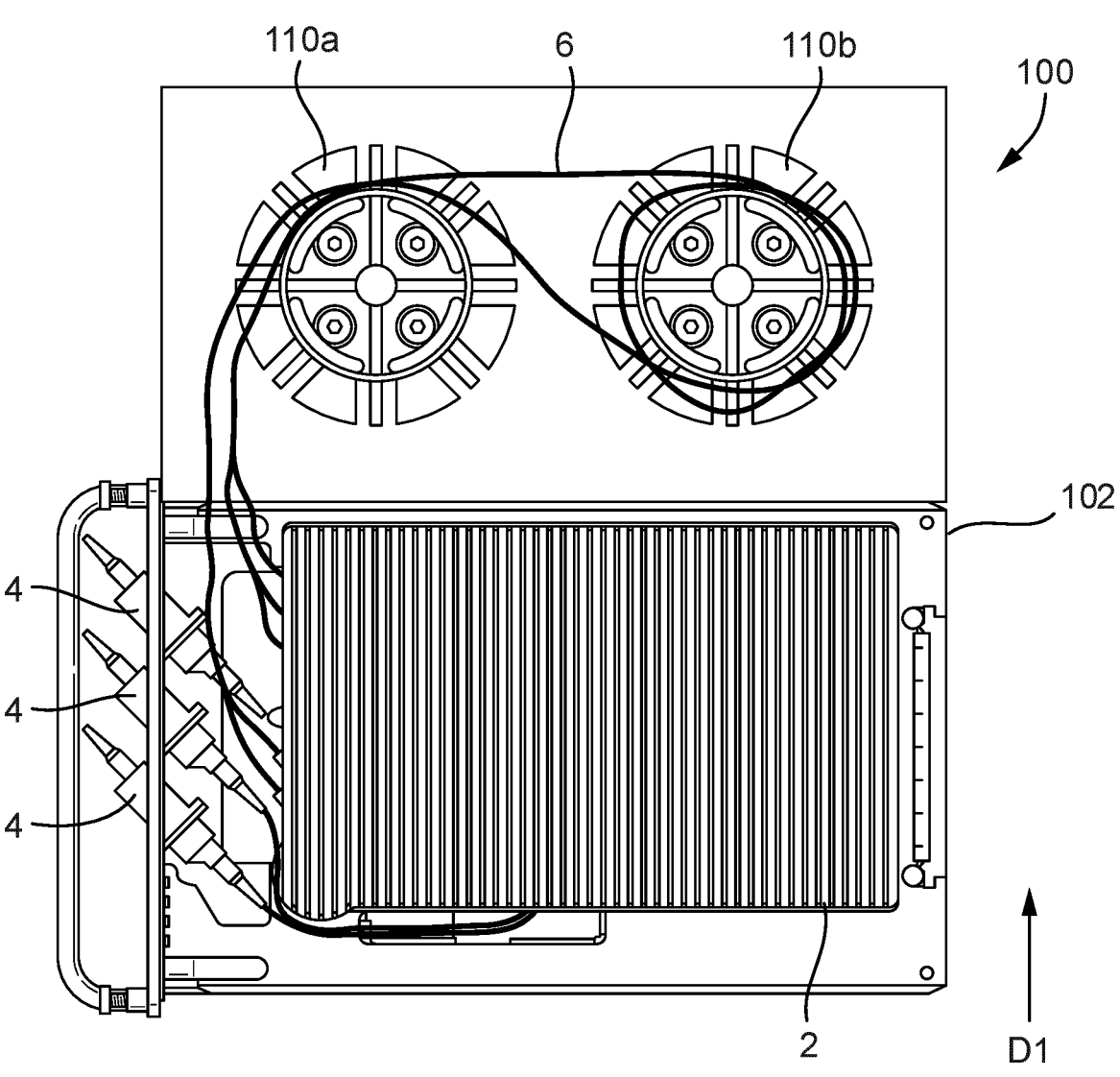
FIG. 2 is a top view of a previously proposed mounting assembly for mounting the optical device.

With reference to FIG. 2, the optical device 2 may be mounted on a previously proposed mounting assembly 100. The optical device 2 mounted on a mounting assembly, such as the previously proposed mounting assembly 100, may form an electro-optical function unit. The mounting assembly 100 may be configured to couple to, e.g. be fitted to, a rack mountable device, such as a rack mountable telecommunications network device, that can be installed into a device rack, such as a European Telecommunications Standards Institute (ETSI) or American National Standards Institute (ANSI) device rack. The optical device 2 may thereby be, indirectly, mounted on the device rack.

The previously proposed mounting assembly 100 comprises a Printed Circuit Board (PCB) 102. One or more electronic components may be mounted on the PCB 102. As depicted in FIG. 2, the optical device 2 may be coupled, directly or indirectly, to the PCB 102.

When the optical device 2 is mounted on a mounting assembly, such as the previously proposed mounting assembly 100, it is desirable for the lengths of optical fibre 6 extending between the optical device 2 and the connectors 4, which may include the additional length, to be suitably supported during use of the optical device 2. Suitably supporting the lengths of optical fibre 6 may prevent, or reduce the risk of, damage to the optical fibre 6.

As shown in FIG. 2, the previously proposed mounting assembly 100 comprises a pair of fibre guides 110a, 110b arranged to one side of the optical device 2. When the optical device 2 is mounted on the previously proposed mounting assembly 100, the lengths of optical fibre 6 extending between the optical device 2 and the optical connectors 4 can be wound around and between fibre guides 110a, 110b so that the lengths of optical fibre are supported by the previously proposed mounting assembly 100.

It is desirable to ensure that a bending radius of the optical fibre 6 wound around the fibre guides 110a, 110b is greater than or equal to a minimum bend radius of the optical fibre, e.g. a radius about which the optical fibre may be bend without risking damage to the optical fibre. Hence, a dimension of the fibre guides 110a, 110b may be sized to enforce a bend radius of greater than or equal to the minimum bend radius of the optical fibre, when the optical fibre is wound around the fibre guides 110a, 110b. Including the fibre guides 110a, 110b having the dimension significantly increases the size of the previously proposed mounting assembly 100. In particular, as shown in FIG. 2, a dimension on the previously proposed mounting assembly 100 in a width direction $D_1$ is greater than twice a dimension of the optical device 2 in the width direction $D_1$.

Figure 1:
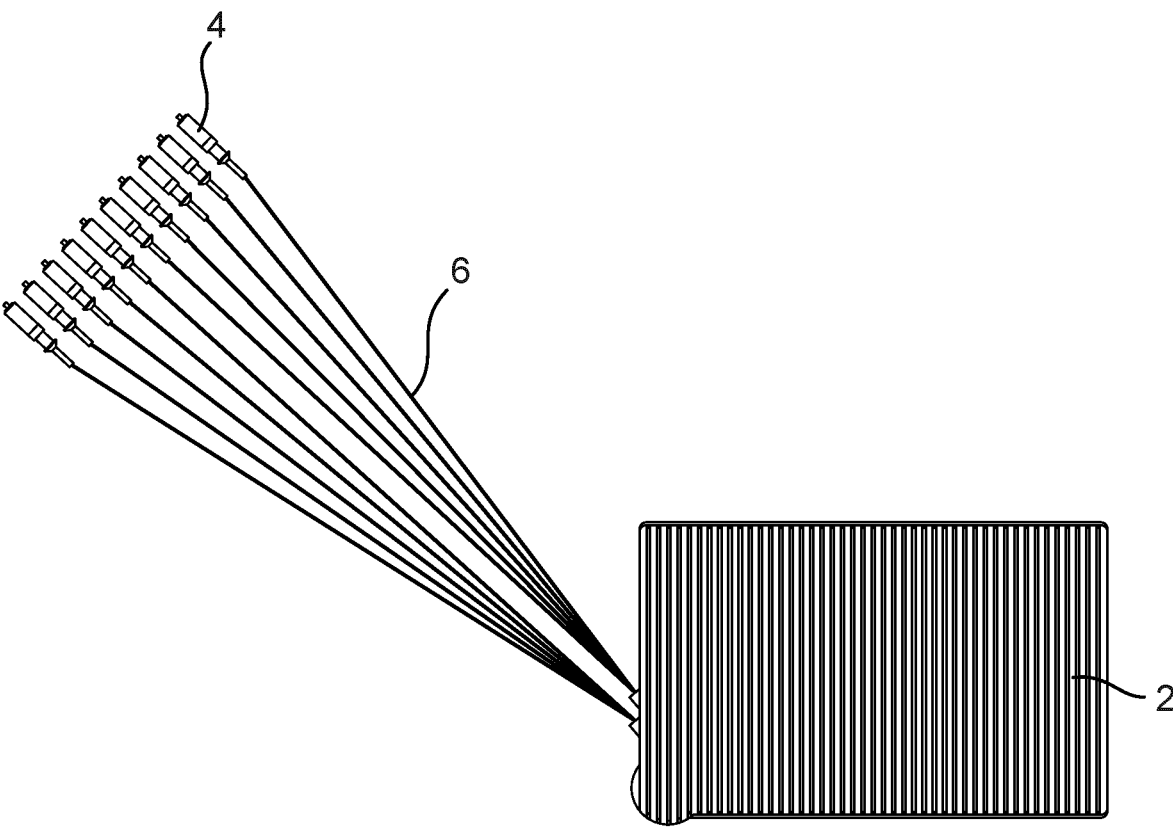
FIG. 1 is a top view of an optical device.
Figure 3A:
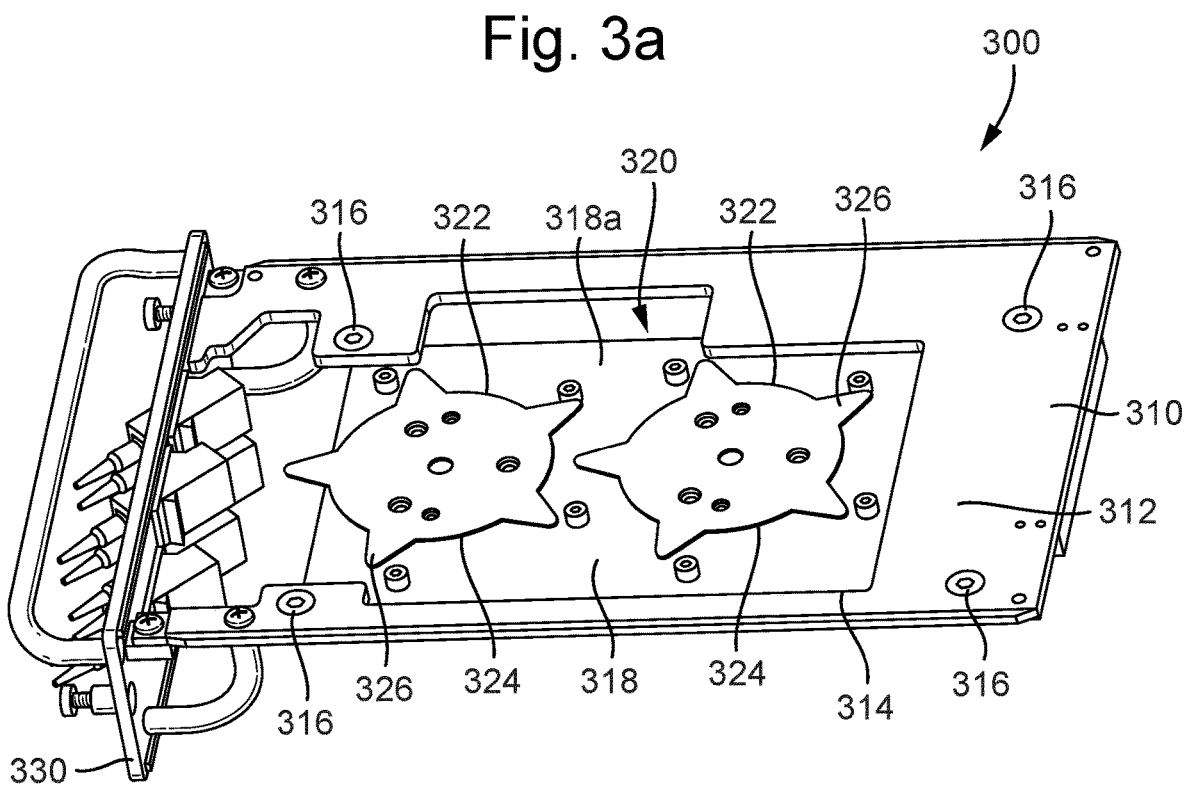
FIG. 3a is a perspective, bottom view of a mounting assembly for mounting the optical device, according to arrangements of the present disclosure.
Figure 3B:
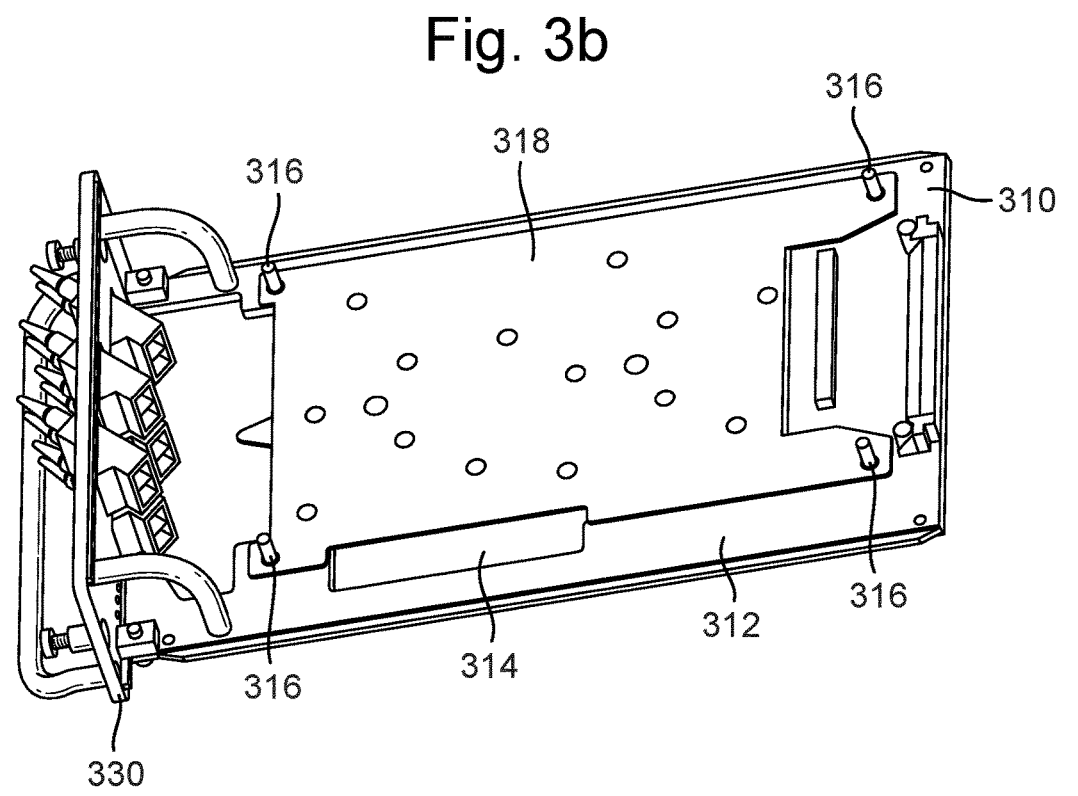

With reference to FIGS. 3a and 3b, a mounting assembly 300 according to arrangements of the present disclosure comprises a base member 310 for an optical device, such as the optical device 2 (shown in FIG. 1), to be mounted on. As shown in FIG. 3a, the base member 310 may comprise an opening 314 formed in the base member 310. In particular, the opening 314 may be formed in a base plate 312 of the base member.

When the optical device 2 is mounted on the mounting assembly 300, e.g. to the base member 310, the optical device 2 at least partially overlaps the opening 314. For example, the base member 310 may comprise one or more fixings 316 to which the optical device 2 can be coupled to mount the optical device on the mounting assembly 300 such that the optical device 2 at least partially overlaps the opening 314. In one or more arrangements, the fixings 316 may be stand-off fixings, which may be coupled to the base plate 312 for mounting the optical device 2 on the base member spaced apart from the base plate 312.

In some arrangements, the base plate 312 may be a printed circuit board on which one or more electronic components (not shown), e.g. to operate in conjunction with the optical device 2, may be mounted and/or to which the one or more electronic components may be electrically connected.

The mounting assembly 300 further comprises an optical fibre guide 320 for one or more optical fibres, such as the optical fibres 6, extended from the optical device 2 to be disposed about, e.g. wound or wrapped around, in order to support a length of the one or more optical fibres 6 on the mounting assembly 300.

In the arrangement shown in FIG. 3a, the optical fibre guide 320 comprises spools 322, e.g. cylindrical spools, about and/or between which the optical fibres 6 can be wound. The optical fibre guide 320 may at least partially define one or more cylindrical surfaces about and/or between which the optical fibres can be wound. For example, the optical fibre guides, e.g. the spools 322 or other structures of the optical fibre guides, may define one or more curved and or straight guide portions 324 at least partially defining the one or more cylindrical surfaces.

In some arrangements, the optical fibre guide 320 at least partially defines two or more cylindrical surfaces about and between which the one or more optical fibres 6 can be wound. Central axes of the two or more cylindrical surfaces may be parallel with one another. The two or more cylindrical surfaces may be spaced apart from one another in a direction perpendicular to the central axes of the cylindrical surfaces.

One or more radii of the cylindrical surfaces defined by the optical fibre guide 320 may be equal to or greater than a minimum bend radius of the optical fibres 6, so that the optical fibres 6 a risk of the optical fibres 6 being bent through a radius of less than a minimum bend radius of the optical fibres when being wound around and/or between the cylindrical surfaces defined by the optical fibre guide 320 in reduced. In some arrangements, the configuration of the optical fibre guide 320 may prevent the optical fibres from being bent through a radius of less than a minimum bend radius of the optical fibres when being wound around and/or between the cylindrical surfaces defined by the optical fibre guide 320. In this way, the optical fibre guide 320 may prevent, or reduce the risk of, the optical fibres 6 becoming damaged when they are wound around and/or between the cylindrical surfaces defined by the optical fibre guides.

As shown in FIG. 3a, the optical fibre guide 320, e.g. the one or more cylindrical surfaces at least partially defined by the optical fibre guide, is located at least partially within the opening 314. In other words, the optical fibre guide 320 is at least partially recessed within the opening 314 in the base member 310. Accordingly, at least part of the length of the optical fibre 6 supported by the optical fibre guide is disposed, e.g. recessed, within the opening 314 formed in the base member. The mounting assembly 300 may thereby be configured such that at least part of the length of the optical fibre 6 supported by the optical fibre guide 320 is overlapped by the optical device 2 mounted on the mounting assembly 300.

A thickness of the optical fibre guide 320, measured in the direction in which the optical fibre guide is recessed into the opening, may be less than or equal to a thickness of the base member, e.g. the base plate. Hence, the optical fibre guide 320, e.g. the one or more cylindrical surfaces at least partially defined by the optical fibre guide, may be substantially completely received, e.g. recessed, within the opening 314. In other words, the optical fibre guide 320 may not protrude from the opening 314 in the base member 310.

The mounting assembly 300 may further comprise a plate 318. The plate 318 may be coupled to the base member 310, e.g. to the base plate 312 of the base member 310. As shown in FIGS. 3a and 3b, the plate 318 may at least partially overlap the opening 314. In particular, a main face 318a of the plate, e.g. a face with the largest surface area amongst the faces of the plate, may be coupled to a face of the base plate 312, such that the main face 318a extends over the opening 314.

The optical fibre guide 320 may be coupled to the plate 318. For example, as shown in FIG. 3a, the optical fibre guide 320 maybe coupled to a part of the plate 318 overlapping the opening 314, so that the optical fibre guide 320 is located within the opening 314.

As shown in FIG. 3b, the fixings 316 for mounting the optical device 2 on the mounting assembly 300 may be coupled to the base plate 312. The fixings 316 maybe coupled to the face of the base plate 312 to which the plate 318 is coupled. The fixings 316 may extend from the base member 310, e.g. from the base plate 312, beyond the plate 318, e.g. by a distance greater than a thickness of the plate 318. In some arrangements, the fixings 316 may extend through the plate 318, e.g. through openings from in the plate 318. The optical device 2 may thereby be coupled to the base member 310, e.g. to the fixings 316, on one side of the plate 318. The optical fibre guide 320 may be coupled to the opposite side of the plate 318 from the optical device 2. In other arrangements, the optical fibre guide 320 may be coupled, e.g. directly coupled, to the optical device 2. In such arrangements, the plate 318 may be omitted.

The mounting assembly 300 may further comprise an optical connector mounting portion 330 on which the optical connectors 4 connected to the optical fibres 6 of the optical device 2 may be mounted, in order to support the optical connectors 4. The optical connector mounting portion 330 may be coupled to the base member 310. As depicted, the optical connector mounting portion 330 may be coupled to the base plate 312. When the mounting assembly 300 forms an electro-optical function unit to be coupled, e.g. fitted, to a rack mountable device, such as a rack mountable telecommunications network device, to be mounted on a device rack, such as an ETSI or ANSI device rack, the optical connector mounting portion 330 may form a front plate for the electro-optical function unit.

Returning to FIG. 3a, the optical fibre guide 320 may further comprise one or more protrusions 326 extended outwardly from the optical fibre guide 320 relative to the cylindrical surfaces at least partially defined by the optical fibre guide. The protrusions 326 may be shaped to retain the optical fibres about the optical fibre guide 320. For example, the protrusions 326 may be shaped to prevent the optical fibres from displaced along the optical fibre guide 320 in a direction parallel with the central axis of the cylindrical surface defined by the optical fibre guide. In other words, the protrusions 326 may retain the optical fibres 6 in a position in which the optical fibres are aligned with the optical fibre guide 320 in a direction parallel with the central axis of the one or more cylindrical surfaces defined by the optical fibre guide 320. The optical fibres 6 disposed about optical fibre guide 320 may be retained between the one or more of the protrusions 326, and the plate 318 or the optical device 2. In this way, the optical fibres 6 may be retained within the opening 314.

Figure 4:
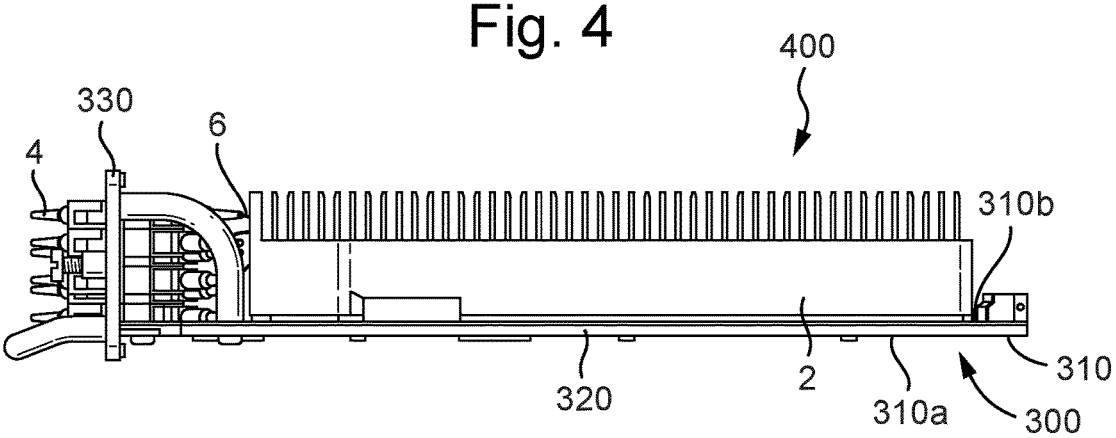
FIG. 4 is a side view of an optical device system including the optical device shown in FIG. 1 and the mounting assembly shown in FIGS. 3a and 3b.

With reference to FIG. 4, an optical device system 400 comprises the mounting assembly 300 and the optical device 2 mounted on the mounting assembly 300. As depicted in FIG. 4, the optical fibre guide 320 may be flush or under flush with a side 310a of the base member 310 opposite from the side 310b of the base member on which the optical device 2 is mounted.

Figure 5A:
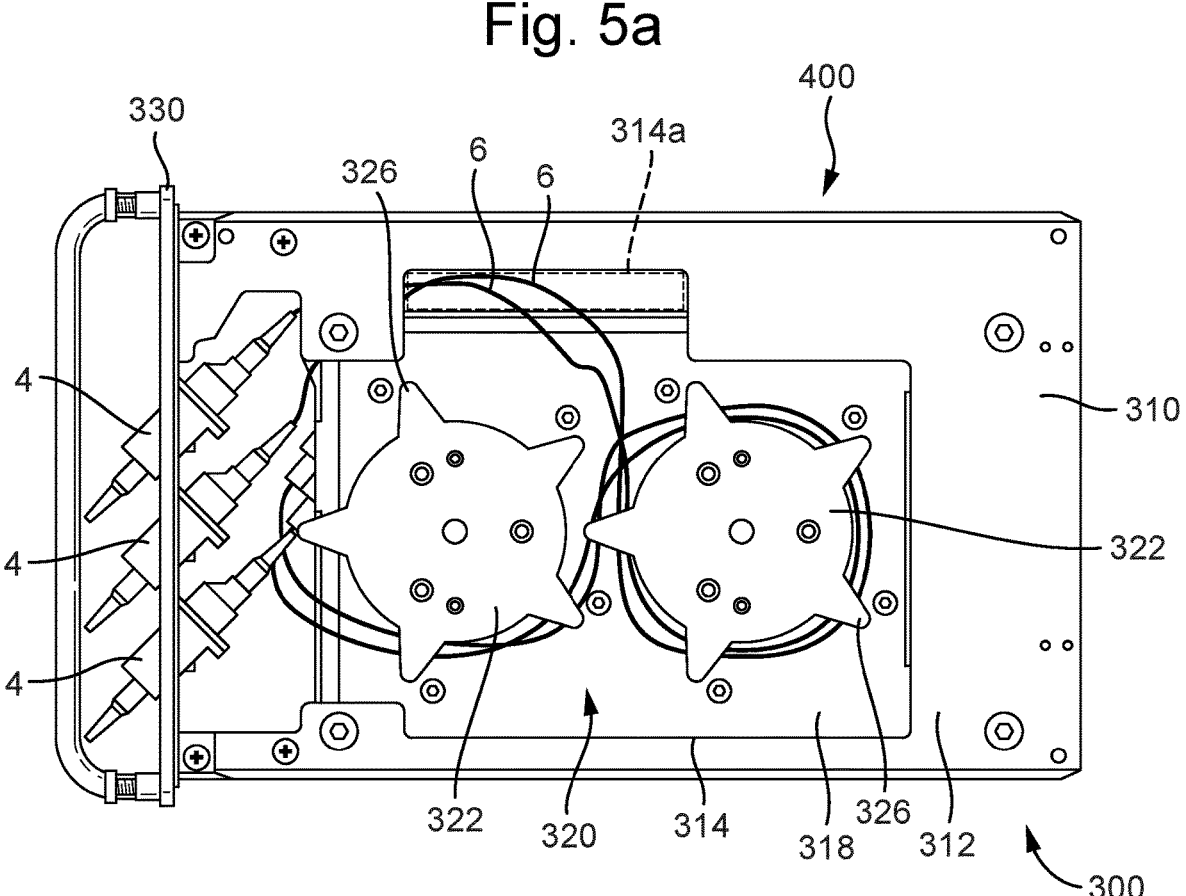
FIG. 5a is a bottom view of the system shown in FIG. 4 with a cover component omitted for clarity.
Figure 5B:
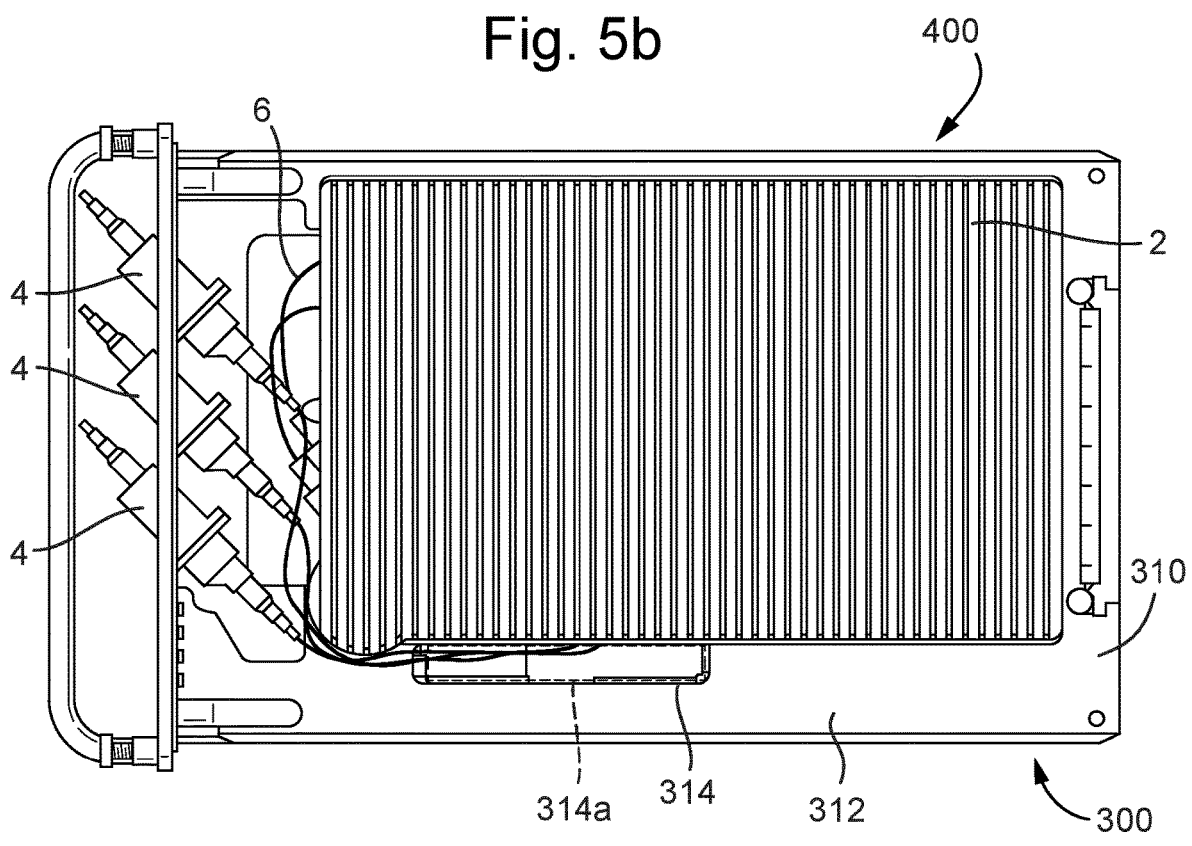
FIG. 5b is a top view of the system shown in FIG. 4.

With reference to FIGS. 5a and 5b, the opening 314 may comprise a portion 314a not overlapped by the optical device 2, when the optical device is mounted on the mounting assembly, and the plate 318 (if present). The portion 314a not overlapped by the optical device 2 and plate 318 may form a space through which the optical fibres 6 can be routed from the optical device 2 to and or from the optical fibre guide 320, e.g. between the optical device 2 and the optical fibre guide 320 and/or between the optical fibre guide 320 and the optical connector mounting portion 330. In some arrangements, the opening 314 may comprise more than one separate portion not overlapped by the optical device 2 and the plate (if present).

Figure 6:
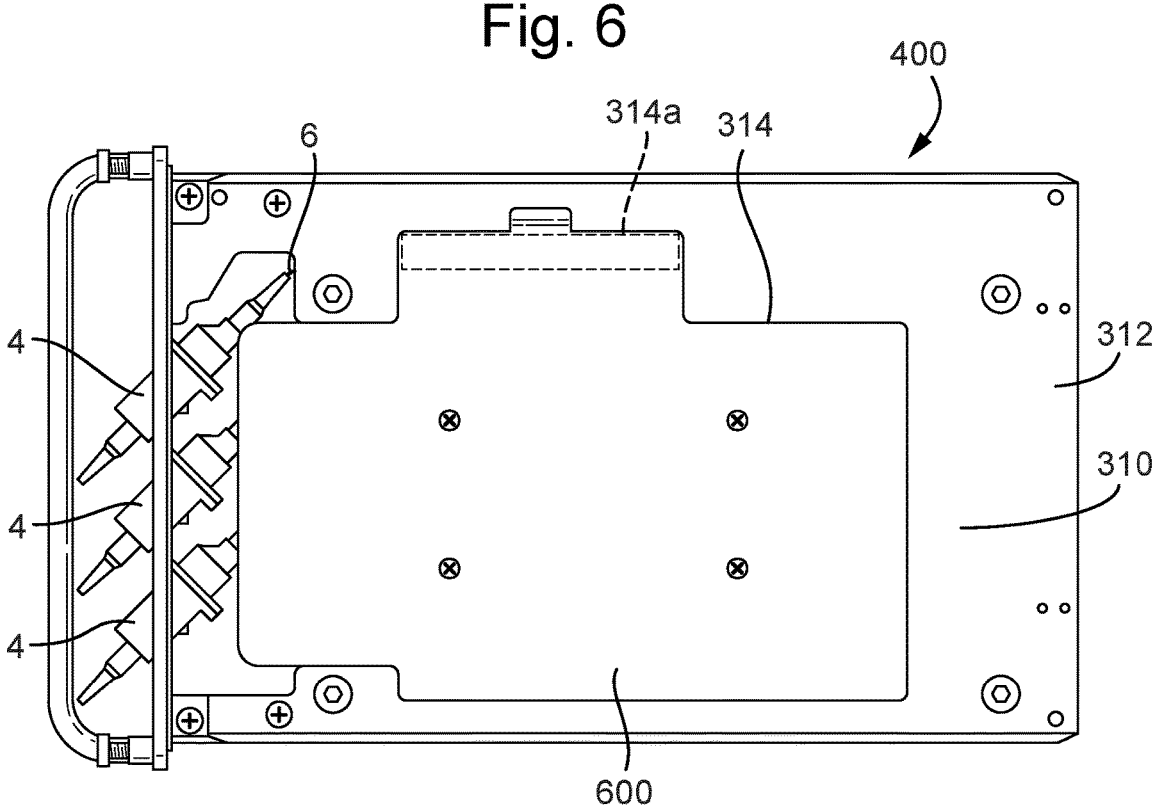
FIG. 6 is a bottom view of the system shown in FIG. 4 including the cover.

With reference to FIG. 6, the mounting assembly 300 may comprise a cover 600 to at least partially overlap the opening 314. The cover 600 may be provided on an opposite side of the optical fibre guide 320 from the optical device 2, when the device is mounted on the base member 310, and the plate 318 (if present). As shown, the cover 600 may overlap the portion 314a of the opening. The cover 600 may be coupled to the base member 310, e.g. to the base plate 312. In some arrangements, the cover 600 may be coupled to the base member 310 at one or more edges of the opening 314. For example, one or more portions of the cover 600 may form an interference fit with the edges of the opening 314 in order to couple the cover 600 to the base member 310.

Figure 7:
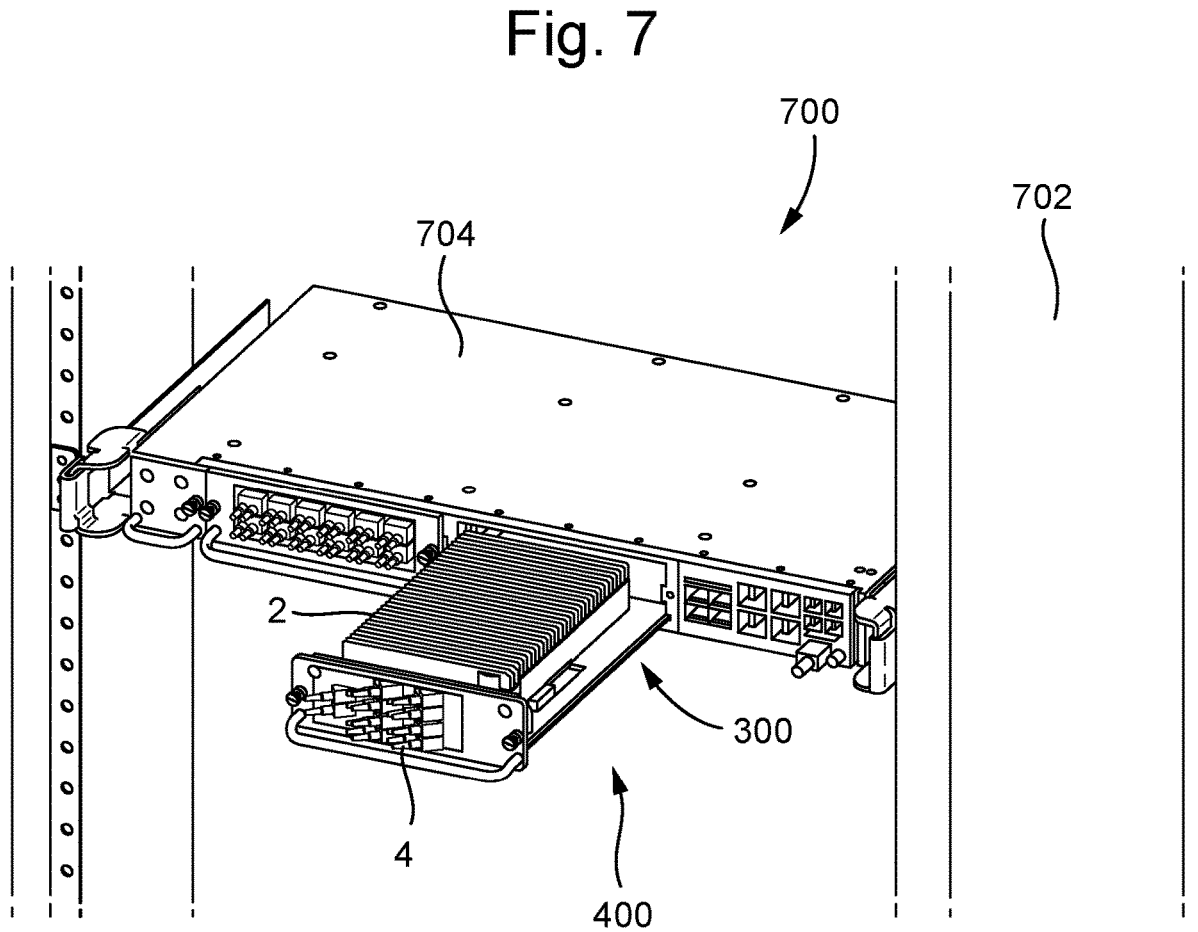
FIG. 7 is a perspective top view of telecommunications network rack for receiving rack mountable equipment.

With reference to FIG. 7, telecommunications network equipment 700 may comprise one or more of the mounting assemblies 300 and/or one or more of the optical device systems 400. In one or more arrangements, the telecommunications network equipment 700 comprises a rack 702, e.g. a device rack, such as an ETSI or ANSI device rack. The rack 702 may define a plurality of spaces for receiving rack mountable equipment 704, such as rack mountable telecommunications network devices, mounted on the rack 702. As depicted, the one or more optical device mounting assemblies 300 and/or the one or more optical device systems 400 may be configured to couple to the rack mountable devices 704 mounted on the rack 702. The one or more mounting assemblies 300 and/or the one or more optical device systems 400 may thereby be mounted, e.g. indirectly mounted, on the rack 702 and arranged in respective ones of the spaces defined by the rack 702.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

The invention claimed is:

1. An optical device mounting assembly, the mounting assembly comprising:

a base member for an optical device to be mounted on, wherein the base member comprises an opening formed in the base member such that the optical device at least partially overlaps the opening when mounted on the base member; and an optical fiber guide for an optical fiber extending from the optical device to be disposed about in order to support a length of the optical fiber on the mounting assembly, the optical fiber guide comprising:

one or more cylindrical surfaces about which the optical fiber can be wound; and one or more protrusions protruding outwardly relative to the one or more cylindrical surfaces for retaining the optical fiber about the optical fiber guide, wherein the optical fiber guide is located at least partially within the opening in the base member, wherein the mounting assembly comprises an optical connector attachment point for an optical connector to be mounted on, wherein the optical fiber guide is arranged to support the optical fiber between the optical device and the optical connector attachment point.

2. The optical device mounting assembly of claim 1, wherein a radius of the one or more cylindrical surfaces defined by the optical fiber guide is equal to or greater than a minimum bending radius of the optical fiber.

3. The optical device mounting assembly of claim 1, wherein the optical fiber guide at least partially defines two cylindrical surfaces about both of which the optical fiber can be wound, wherein the two cylindrical surfaces are spaced apart from one another in a direction perpendicular to central axes of the cylindrical surfaces.

4. The optical device mounting assembly of claim 1, wherein a thickness of the optical fiber guide is less than or equal to a thickness of the base member at the opening.

5. The optical device mounting assembly of claim 1, wherein the optical fiber guide is completely received within the opening in the base member.

6. The optical device mounting assembly of claim 1, wherein the mounting assembly further comprises a cover at least partially overlapping the opening, wherein the cover is provided on an opposite side of the optical fiber guide from the optical device when the optical device is mounted on the base member.

7. The optical device mounting assembly of claim 1, wherein the assembly further comprises a plate coupled to the base member and at least partially overlapping the opening, wherein the optical fiber guide is coupled to the plate.

8. The optical device mounting assembly of claim 7, wherein a portion of the opening not overlapped by the plate and/or the optical device defines a space for the optical fiber to be routed from the optical device to and/or from the optical fiber guide through the opening.

9. The optical device mounting assembly of claim 1, wherein the base member comprises one or more fixings for the optical device to be coupled to the base member.

10. The optical device mounting assembly of claim 9, wherein the assembly further comprises a plate coupled to the base member and at least partially overlapping the opening, wherein the optical fiber guide is coupled to the plate, and wherein the one or more fixings are arranged to mount the optical device on an opposite side of the plate from the optical fiber guide.

11. The optical device mounting assembly of claim 9, wherein a portion of the opening not overlapped by a plate and/or the optical device defines a space for the optical fiber to be routed from the optical device to and/or from the optical fiber guide through the opening, and wherein the one or more fixings are arranged to mount the optical device on an opposite side of the plate from the optical fiber guide.

12. The optical device mounting assembly of claim 1, wherein the base member comprises a printed circuit board.

13. Telecommunications network equipment comprising the optical device mounting assembly of claim 1.

14. Telecommunications network equipment comprising:
a rack defining a plurality of spaces; and
one or more optical device mounting assemblies of claim 1, wherein the one or more optical device mounting assemblies are arranged in respective spaces defined by the rack.

15. An optical device system comprising:
an optical device, the optical device comprising a device body, one or more optical fiber extending from the device body; and one or more connectors coupled to distal ends of the optical fiber respectively; and
the optical device mounting assembly comprising:

a base member for an optical device to be mounted on, wherein the base member comprises an opening formed in the base member such that the optical device at least partially overlaps the opening when mounted on the base member; and
an optical fiber guide for an optical fiber extending from the optical device to be disposed about in order to support a length of the optical fiber on the mounting assembly, the optical fiber guide comprising:
one or more cylindrical surfaces about which the optical fiber can be wound; and
one or more protrusions protruding outwardly relative to the one or more cylindrical surfaces for retaining the optical fiber about the optical fiber guide,
wherein the optical fiber guide is located at least partially within the opening in the base member, wherein the mounting assembly comprises an optical connector attachment point for an optical connector to be mounted on, wherein the optical fiber guide is arranged to support the optical fiber between the optical device and the optical connector attachment point,
wherein the device body is mounted on the base member and portions of the optical fiber extending between the optical device and the connectors are disposed about the optical fiber guide.

16. Telecommunications network equipment comprising the optical device system of claim 15.

17. Telecommunications network equipment comprising:
a rack defining a plurality of spaces; and
one or more optical device systems of claim 15, wherein the one or more optical device systems are arranged in respective spaces defined by the rack.

* * * * *